United States Patent [19]
Hitchings

[11] Patent Number: 6,006,941
[45] Date of Patent: Dec. 28, 1999

[54] SECURITY CONTAINER

[75] Inventor: Glenn E. Hitchings, Marrickville, Australia

[73] Assignee: Proloc Security Systems Pty Limited, New South Wales, Australia

[21] Appl. No.: 09/051,519

[22] PCT Filed: Oct. 10, 1996

[86] PCT No.: PCT/AU96/00636

§ 371 Date: Aug. 19, 1998

§ 102(e) Date: Aug. 19, 1998

[87] PCT Pub. No.: WO97/13945

PCT Pub. Date: Apr. 17, 1997

[30] Foreign Application Priority Data

Oct. 10, 1995 [AU] Australia ............................... PN 5901

[51] Int. Cl.⁶ .................................................. B65D 17/52
[52] U.S. Cl. ........................ 220/284; 220/326; 220/835; 220/844; 220/4.22
[58] Field of Search ..................................... 220/284, 326, 220/833, 835, 843, 844, 4.22

[56] References Cited

U.S. PATENT DOCUMENTS

| | | | |
|---|---|---|---|
| 4,673,100 | 6/1987 | Reis et al. ................................ | 220/324 |
| 4,834,238 | 5/1989 | Hehn et al. . | |
| 5,577,779 | 11/1996 | Dangel ................................. | 220/326 X |

FOREIGN PATENT DOCUMENTS

| | | |
|---|---|---|
| B51814/93 | 4/1994 | Australia . |
| 0 522 679 A2 | 1/1993 | European Pat. Off. . |
| 0 653 534 A1 | 5/1995 | European Pat. Off. . |
| 2 257 693 | 1/1993 | United Kingdom . |
| WO 92/08026 | 5/1992 | WIPO . |
| WO 92/13779 | 8/1992 | WIPO . |
| WO 92/18734 | 10/1992 | WIPO . |
| WO 94/14673 | 7/1994 | WIPO . |
| WO 95/14841 | 6/1995 | WIPO . |

Primary Examiner—Stephen K. Cronin
Attorney, Agent, or Firm—Skinner and Associates

[57] ABSTRACT

A container (1) includes a receptacle portion (3) and a lid (2) butt ends thereof being hingeably connected one to the other, one or more resiliently mounted teeth (4) are formed which extend upwardly from a forward end of the receptacle portion (3), and which include a body portion with a recess (5) extending therethrough; a plurality of laterally spaced apart protrusions (6) are provided and extend inwardly from a forward end of the lid (2), such that on the lid being hinged over the receptacle portion, the protrusions contact and move over the resiliently mounted teeth (4) so as to releasably engage within the recesses and so as to releasably lock the receptacle portion (3) and lid (2) together. Recess means (10) are provided and extend through an upper surface of the lid (2), adjacent a front face thereof, so as to allow for the insertion of release means (11) therethrough and between said one or more teeth (4) and a forward end of said lid (2) and into contact with a movable release bar (9) which acts to deflect the teeth (4) away from the front face of the lid, so as to allow for disengagement between said one or more teeth (4) and said one or more protrusions (6) and subsequent release of said lid (2) from said receptacle portion (3).

17 Claims, 3 Drawing Sheets

SECURITY CONTAINER

TECHNICAL FIELD

This invention relates to an improved container and in particular to a container for use, in one form of the invention, as a security container.

BACKGROUND ART

In this day and age containers are used for a number of purposes and in particular are used in connection with the sale and renting of video tapes, compact discs, computer games and the like. Such products are often placed in security containers for display, wherein the security containers carries some form of coding or bar code, so that if the containers are removed from a premises without authority, monitoring means will actuate appropriate alarms. For example, in premises where videos, tapes, compact discs, video games and the like are hired out, the games are placed in containers, such as clear plastic containers, and are placed on shelves. These are then viewed by customers and a choice made. Normally the containers are security coded or have some bar code associated therewith for security purposes.

Once a choice is made, the container enclosing the chosen video, disc, video game or the like is taken to the counter and the appropriate money paid. An attendant or assistant at the counter will then remove the video, tape, video game or the like from the container, thereafter handing the chosen article to the purchaser, so that the purchaser can leave the store. Clearly, if the purchaser attempts to leave the store with the video, tape, disc or video game retained in the container, alarms and the like will be actuated.

Reference to the hiring of video tapes, discs, video games and the like is by way of example only. It should be appreciated that containers can be used in many areas, such as for the display of any desired goods for hire, sale or the like. They can be used in department stores, retail stores, wholesale outlets or the like.

It will however be appreciated that it is important that containers which display such goods are in essence security containers which cannot be easily opened so that the goods displayed therein or contained therein can be removed. Various forms of security container have been suggested and are know. However, these are often difficult and time consuming to manufacture and effectively to use.

One security container according to the prior art is that disclosed in EP 522679 (Alpha Enterprises, Inc.), but it suffers from the disadvantage that its construction makes it relatively easy to break into, because of external hinges and multiple leverage points for forced entry.

The security container according to our earlier Australian patent application No. 57964/94 overcomes these disadvantages, but suffers from the disadvantage that its construction requires a separate releaser (opening device) for different sizes or types of containers (e.g. different releasers for compact disc containers and for video containers).

DISCLOSURE OF THE INVENTION

It is an object of ane aspect of this invention to go at least some way towards overcoming or at least minimising problems associated with such security containers up until this time.

It is a further object of one aspect of this invention to provide a straightforward and efficient security container which is universal for multiple products.

It is a further object of one aspect of the present invention to provide a straightforward and efficient releasable locking means for use in association with a security container, which may, in one form of the invention, be a security container.

These and other objects of the present invention will become more apparent from the following descriptions and the drawings.

According to one aspect of this invention, there is provided a container including a receptacle portion and lid; and wherein butt ends thereof are hingeably connected one to the other; forward ends of said receptacle portion and said lid being so formed as to allow for releasable locking engagement therebetween; one or more resiliently mounted teeth being formed or provided at and within, a forward end of said receptacle portion; said one or more teeth including a body portion with a recess or aperture extending therethrough; one or more protrusions being provided and extending inwardly from a forward end of said lid; wherein on said receptacle portion being hinged downwardly over said lid, said one or more protrusions will contact and move over said one or more resiliently mounted teeth, so as to releasably engage within said recess(es) or aperture(s) of said one or more teeth and so as to releasably lock said receptacle portion and said lid together; one or more abutment members being provided and extending inwardly from a forward end of said lid; elongate metal rod means being provided at and within a forward end of said lid adjacent and beneath said abutment members; aperture means being provided and extending through a upper surface of said lid such as to allow for the insertion of release means through said aperture means to act on said rod means which are deflected by said abutment members towards the lower end of said one or more teeth, such as to bring about disengagement between said one or more teeth and said one or more protrusions, and subsequent release of said lid from said receptacle portion.

In an alternative embodiment, the resiliently mounted teeth are provided or formed at and within a forward end of the lid, the protrusions and abutment members are provided extending inwardly from a forward end of the receptacle portion, with the elongate metal rod means being provided at and within a forward end of the receptacle portion adjacent and beneath the abutment members, and with aperture means being provided and extending through a lower surface of the receptacle portion such as to allow for the insertion of release means therethrough to act on said rod means to bring about disengagement between said one or more teeth and said one or more protrusions, and subsequently release of said lid from said receptacle portion.

Ideally, the metal rod means comprises one or more metal rods which co-act with (in the first embodiment) the underside of the abutment members in a cam and cam follower relationship to bring about disengagement between the teeth and the corresponding protrusions and the release of the locking engagement between the lid and the receptacle portion.

BRIEF DESCRIPTION OF THE DRAWINGS

This invention will now be further described by way of example only and with reference to the accompanying drawings, wherein.

BEST MODE OF CARRYING OUT THE INVENTION

This invention will now be described by way of example only with reference to the accompanying drawings with particular reference to security containers. It should be appreciated however that the invention has application in other areas and to all forms of container.

Figure 4:
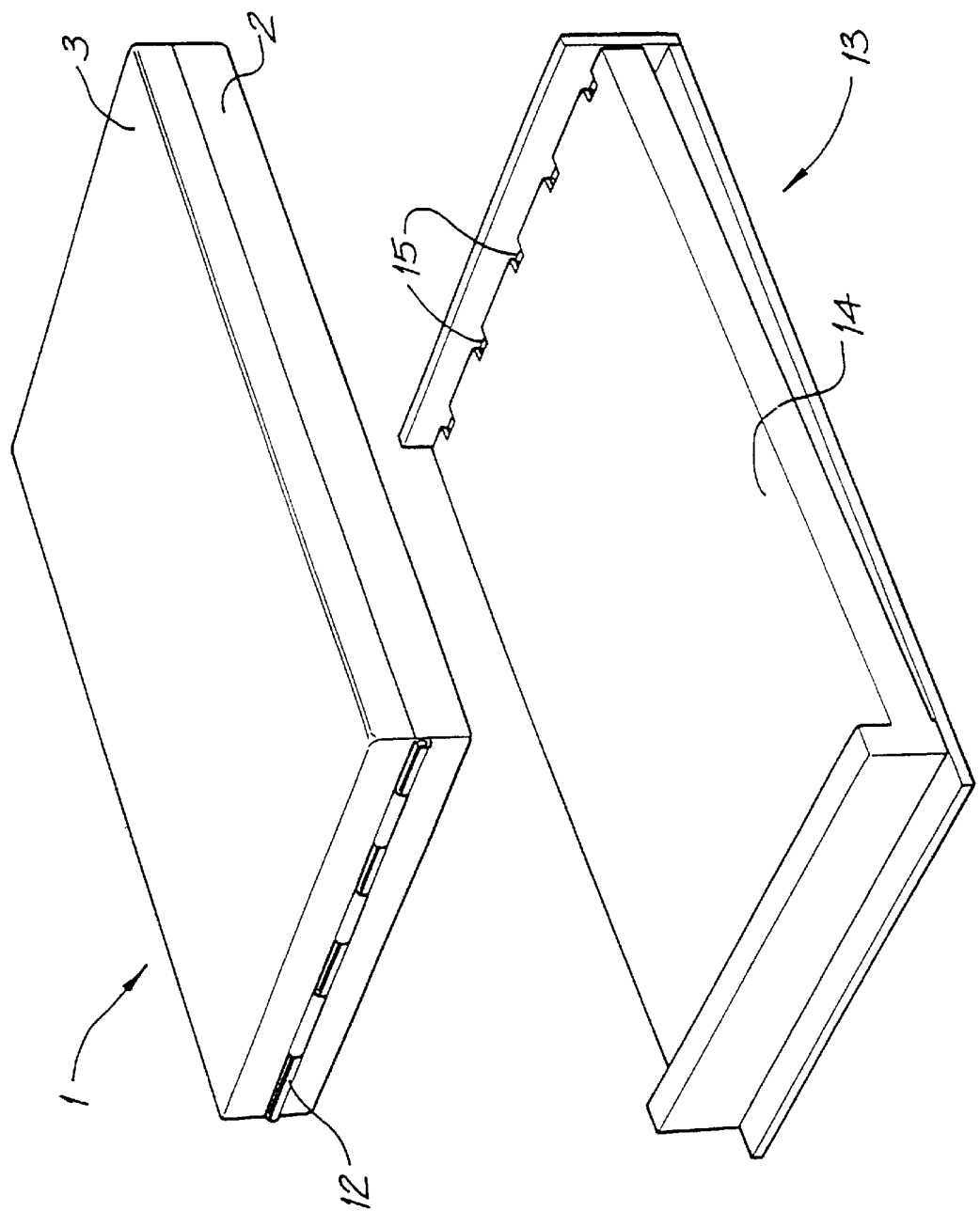
FIG. 4 is an exploded perspective view of a security container according to the invention and a release tool for disengaging the lid portion from the receptacle portion. The container is shown in the inverted position with the lid portion lower most and the receptacle portion uppermost.

In one form of the invention the container 1 is formed of a clear plastics material. The container 1 preferably has a main body portion in the form of a receptacle portion 3 adapted to receive the product or products concerned, and a lid 2 hingeably connected thereto. Preferably, the receptacle portion 3 and the lid 2 are hingeably engaged at butt ends (as shown in FIG. 4), while at the front end means are provided to allow for releasable engagement between the receptacle portion 3 and the lid 2.

Figure 2:
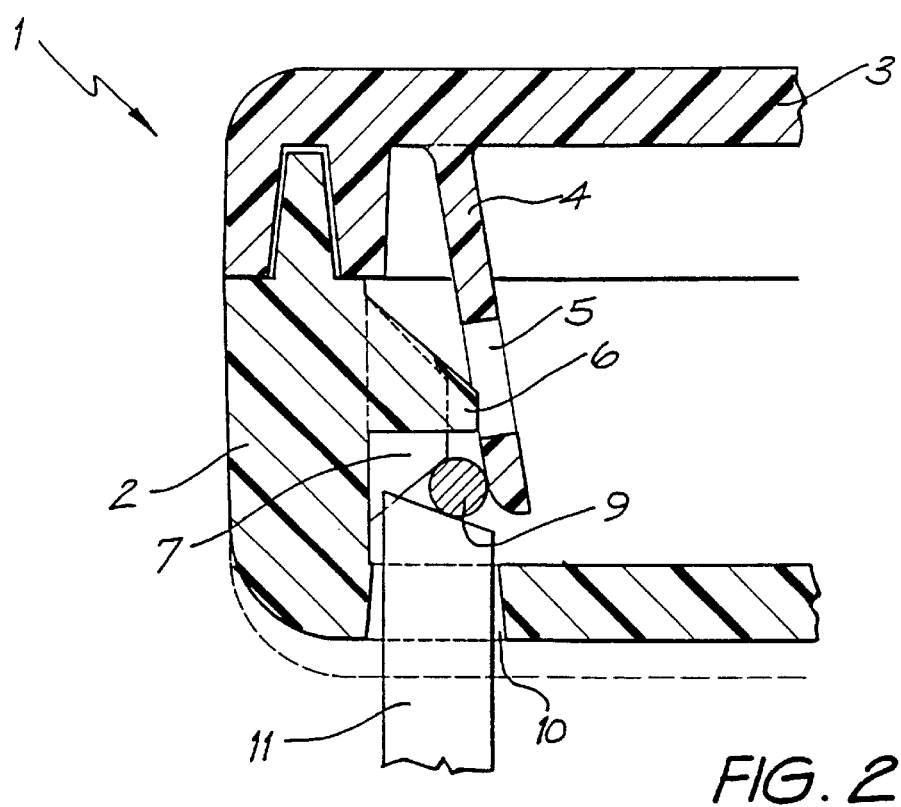
FIG. 2 is a similar view to that of FIG. 1, but with the release means operative to release the lid from the receptacle portion.
Figure 3:
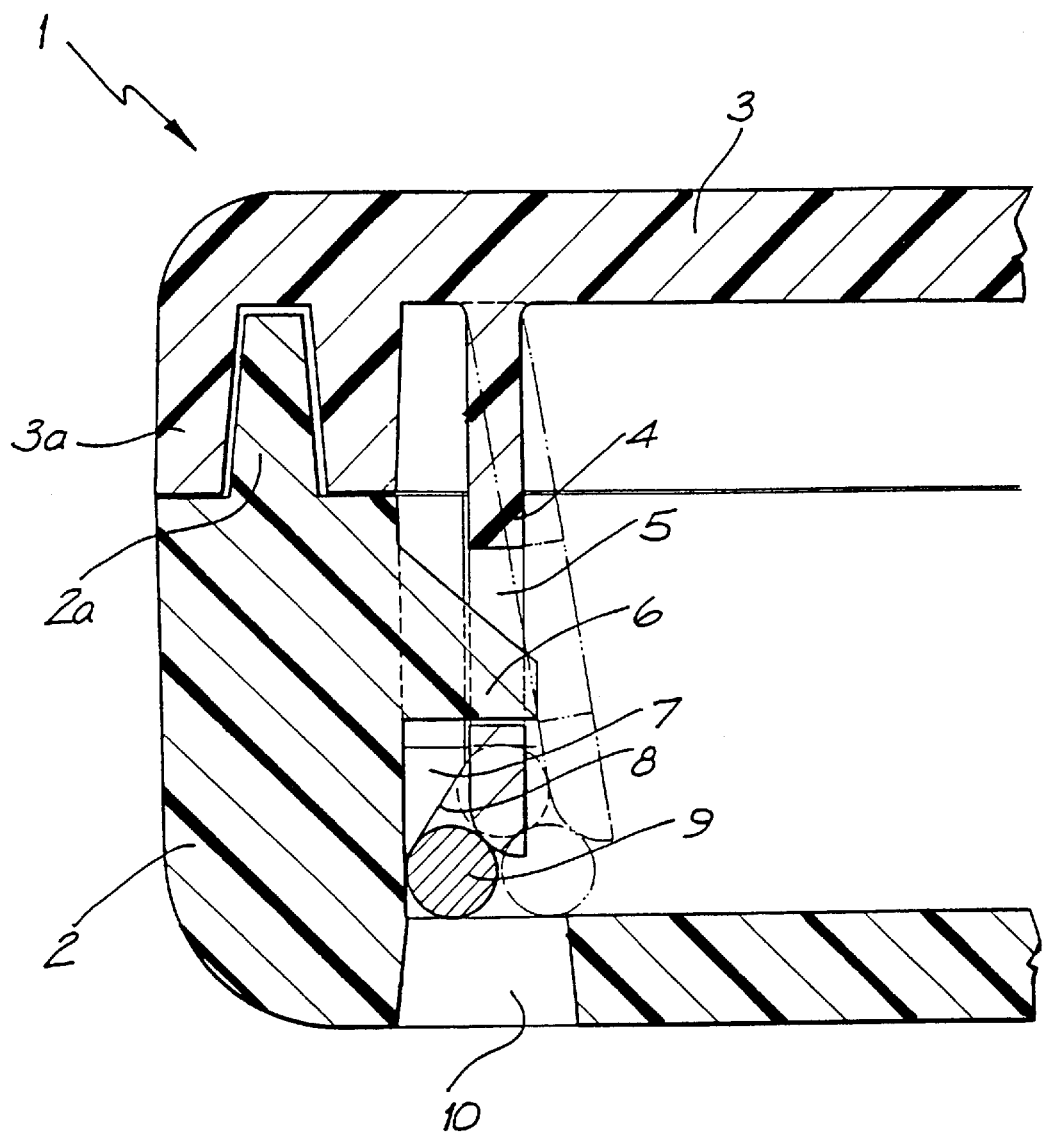
FIG. 3 represents a composite view of the container as depicted in FIGS. 1 and 2 showing the movement phases of the metal rod release means and locking teeth in relation to their respective protrusions.

In that, in one form of the invention, it is preferred that the container 1 be a security container, side edges 2a and 3a of the receptacle portion 3 and the lid 2 are preferably formed so as to provide as secure a closure as possible. For example, it is desired to avoid as far as possible the ability of unauthorised persons to flex open the sides of the container such as by the insertion of tools such as screw drivers and the like. To this end, and referring to the sectional portion of FIGS. 1–3, a tongue and groove arrangement is provided about the outer perimeter of both the receptacle portion and the lid to prevent the insertion of tools and the like.

In the from of the invention shown with reference to the accompanying drawings, the forward or front ends of the receptacle portion 3 and lid or cover 2 are formed with means to enable or facilitate a releasable locking engagement therebetween. Means are also provided to allow for the insertion of specifically designed release means (FIG. 4) which will enable the locking arrangement to be released. The releasable locking engagement is however located securely within the confines of the closed container and is normally unable to be interfered with from outside. Further, in preferred forms of the invention, the front surfaces and sides of the container 1 (such as surrounding the engagement means) are matt finished or formed of a "cloudy" plastics material so as to be substantially opaque, and so that the locking engagement within the container 1 cannot be viewed from outside. This is however by way of example only.

In the preferred forms of the invention the front of the receptacle 3 is formed with one or more teeth 4. Preferably there are provided, a plurality of laterally spaced apart engagement means in the form of spaced apart and downwardly depending, resiliently mounted teeth 4 formed of an appropriated resilient plastics material. These teeth 4 are provided with recesses or apertures 5 extending therethrough. Preferably, and as shown in the accompanying drawings (and as will be described later), the resiliently mounted teeth 4 are spaced inwardly of the inner surface of the front face of the receptacle 3, so as to provide a spacing therebetween.

The front face of the lid portion 2 is provided with a plurality of laterally spaced apart and inwardly extending locking protrusions or lugs 6, provided with an angled leading face, which are so dimensioned, positioned and profiled that when the receptacle 3 is brought down over the lid portion 2, the lugs will ride over and deflect the resiliently mounted teeth 4, so that the protrusions or lugs 6 thereafter engage within an aperture 5 in the teeth 4, the teeth 4 then resiliently returning to their position of rest wherein the protrusions 6 and resiliently mounted teeth 4 engage in a locking engagement.

The front face of the lid portion 2 is further provided with a plurality of laterally spaced apart and inwardly extending abutment members 7 adapted to extend in the spaces formed in between the laterally spaced apart teeth 4. The abutment members 7 are provided with an upwardly sloping surface 8 on their underside which acts as a camming surface in the manner which will be described below.

Figure 1:
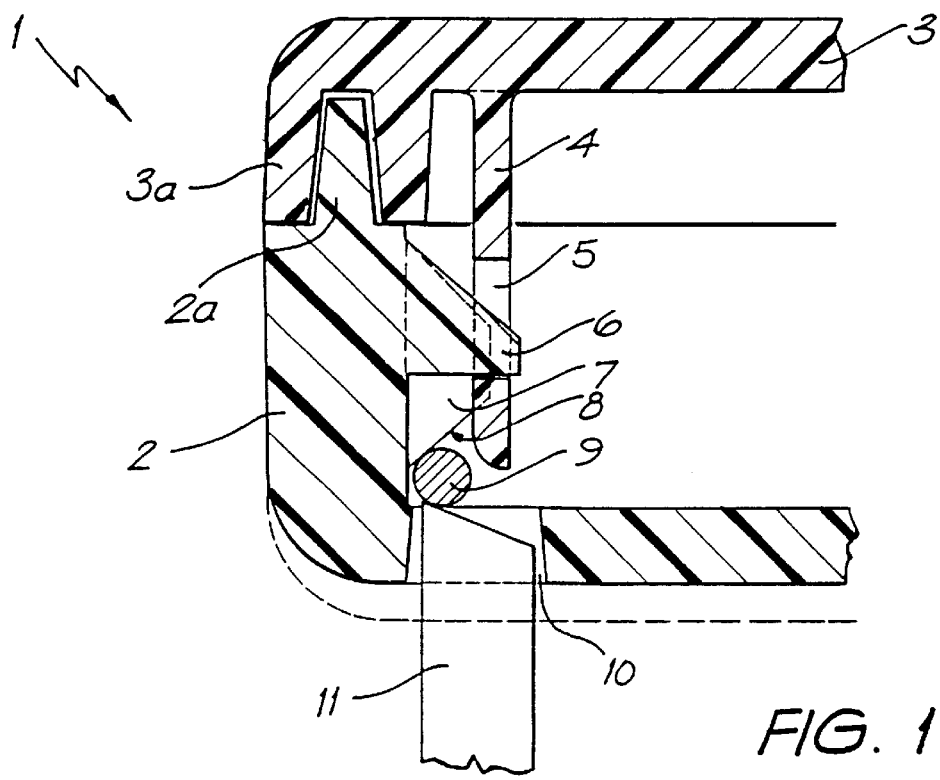
FIG. 1 is a sectional view of front portions of a receptacle portion and lid of a container according to one form of the invention together with a release means according to one form of the invention, showing the container in the locked condition; The container is illustrated in the inverted position.

One or more metal rods or bars 9 is located in the upper end of the lid portion 2 at the front end thereof immediately below the abutment members 7, as shown in FIG. 1. The rod or rods 9 extend across the front of the receptacle portion 2 with the ends thereof being fixed or journalled, but with intermediate portions being resilient and able to flex in response to an external force applied thereto.

In this embodiment, apertures 10 are provided or formed through the lower surface of the inverted lid portion 2, adjacent the front face thereof and below and adjacent to the abutment members 7.

In the preferred form of the invention, the apertures 10 allow for the insertion of appropriate release means or tools (e.g. see FIG. 4), to enable the simultaneous release of the locking protrusions 6 from the apertures 5 of teeth 6. According to this embodiment, release means 11 are inserted through the apertures 10 in the upper surface of the inverted lid 2 and displace or flex the rod (release bar) 9 which acts as a cam follower on the underside camming surfaces 8 of abutment members 7. The displacement of the release bar 9 deflects the resilient teeth 4 away from the front face of the lid portion 2 so as to effectively disengage the protrusions 6 and resilient teeth 4 one from the other, and so as to allow for the release of the engaged lid portion 2 and the receptacle portion 3, and so as to allow the lid or cover 2 to hinge (or be moved) away from the receptacle portion 3 to allow for entry thereinto.

In one form of the invention, and by way of example only and with reference to FIG. 4, a release means can be in the form of a tool 13 having a base 14, which is for example spring-biased with recesses 15 mounted at one end thereof through which release means 11 (FIGS. 1 and 2) can pass. By way of example, a container 1 in which the receptacle portion 3 and lid portion 2 are locked together can be inverted (with the lid or cover portion 2 lowermost)—as described hereinbefore. The locked container can be placed on the base 14 and a downward motion can be applied to the spring-biased or loaded base 14, which will cause the release means 11 to move up through the recesses 15 and through the apertures 10 in the lid 2 and into contact with the release bar 9, which in turn displace the teeth 4 away from the front face of the lid portion 2 to effectively disengage the protrusions 6 and the teeth 4 one from the other, and to allow the lid or cover 2 from the receptacle portion 3.

It will of course be appreciated that as described hereinbefore, in order for a better understanding of the invention, the invention has been described with reference to the drawings wherein the container is shown as being substantially inverted, with the cover or lid being lowermost and the receptacle portion being uppermost, given that this is the orientation in which, in one form of the invention, the engaged receptacle portion and lid are disengaged one from the other. It should be appreciated however that similar means of engagement can be used with the positioning of the lugs and holes being transposed between different integers.

It should also be appreciated that the release means 13 is described also and illustrated by way of example only. Any appropriate release means with lugs or other release means 11 able to disengage the locking arrangement and engagement between the lid and the receptacle portion can be used to advantage.

Although an exemplary embodiment of the present invention has been shown and described, it will be apparent to those having ordinary skill in the art that a number of changes, modifications or alterations to the invention described herein may be made, none of which depart from the spirit of the present invention. All such changes, modifications, and alterations should therefore be seen as being within the scope of the present invention.

It should be appreciated that the present invention provides a substantial advance in locking devices for containers providing all of the herein described advantages without incurring any relative disadvantage.

I claim:

1. A container, comprising:
   a first portion and a second portion hinged together at a first end and adapted to be locked together at a second end;
   at least one resilient tooth mounted on an inner side of the first portion, the tooth having an aperture and an end;
   at least one protrusion provided on the second portion, the protrusion extending inwardly from an inner side of the second portion and adapted for cooperating with the tooth, wherein the resilient tooth moves over the protrusion as the first portion and the second portion are moved together until the protrusion engages with the aperture in the tooth to lock together the first portion and the second portion;
   a plurality of abutment members protruding from the inner side of the second portion and spaced from the protrusion;
   an elongate member adapted to be moveable against the abutment members; and
   at least one container opening in the second portion, wherein a release device for unlocking the first portion and second portion is adapted to be inserted through the opening to urge the elongate member to move past the abutment members and displace the tooth from the corresponding protrusion.

2. The container of claim 1, wherein the at least one tooth mounted on the first portion is a plurality of teeth and the at least one protrusion provided on the second portion is a plurality of protrusions.

3. The container of claim 1, wherein the release device forms part of a release tool, the release tool including a spring-biased base mounted on a platform and at least one recess in the base, the release device being disposed in the recess, the container opening being adapted to be aligned with the recess on the base, the release device being adapted to extend into the container opening when the spring-biased base is depressed and unlock the first portion from the second portion.

4. The container of claim 1, wherein the release device is a pin having an inclined surface adapted for urging the elongate member against the abutment member and wedging the elongate member between the abutment member and the end of the tooth.

5. The container of claim 1, wherein the abutment member has an inclined surface adapted for guiding the elongate member towards the end of the tooth and wedging the elongate member between the abutment member and the end of the tooth.

6. The container of claim 1, wherein the first portion and the second portion each have side edges adapted for forming a tongue and groove engaging arrangement to secure closure of the container.

7. The container of claim 1, wherein the elongate member is a metallic rod.

8. The container of claim 1, wherein the second end of the first portion and second portion are generally opaque.

9. The container of claim 1, wherein the container is formed of a plastic material.

10. A security container system, comprising:
    (a) a container, including:
        a first portion and a second portion hinged together at a first end and adapted to be locked together at a second end;
        at least one resilient tooth mounted on an inner side of the first portion, the tooth having an aperture and an end;
        at least one protrusion provided on the second portion, the protrusion extending inwardly from an inner side of the second portion and adapted for cooperating with the tooth, wherein the resilient tooth moves over the protrusion as the first portion and the second portion are moved together until the protrusion engages with the aperture in the tooth to lock together the first portion and the second portion;
        a plurality of abutment members protruding from the inner side of the second portion and spaced from the protrusion;
        an elongate member adapted to be moveable against the abutment members; and
        at least one container opening in the second portion; and
    (b) a release tool, including:
        a spring-biased base mounted on a platform;
        at least one recess in the base; and
        a release device disposed in the recess, the container opening adapted to be aligned with the recess on the base, the release device being adapted to extend into the container opening when the spring-biased base is depressed and unlock the first portion from the second portion by urging the elongate member to move past the abutment members and displace the tooth from the corresponding protrusion.

11. The security container system of claim 10, wherein the at least one tooth mounted on the first portion is a plurality of teeth and the at least one protrusion provided on the second portion is a plurality of protrusions.

12. The security container system of claim 10, wherein the release device is a pin having an inclined surface adapted for urging the elongate member against the abutment member and wedging the elongate member with the lower end of the tooth.

13. The security container system of claim 10, wherein the abutment member has an inclined surface adapted for guiding the elongate member towards the end of the tooth and wedging the elongate member between the abutment member and the end of the tooth.

14. The security container system of claim 10, wherein the first portion and the second portion each have side edges adapted for forming a tongue and groove engaging arrangement to secure closure of the container.

15. The security container system of claim 10, wherein the elongate member is a metallic rod.

16. The security container system of claim 10, wherein the second end of the first portion and second portion are generally opaque.

17. The security container system of claim 10, wherein the container is formed of a plastic material.

* * * * *